US007546139B2

(12) United States Patent
Money et al.

(10) Patent No.: US 7,546,139 B2
(45) Date of Patent: Jun. 9, 2009

(54) SYSTEM AND METHOD FOR ESTABLISHING AND MAINTAINING COMMUNICATIONS ACROSS DISPARATE NETWORKS

(75) Inventors: James Keith Money, Heathrow, FL (US); Phillip James DuMas, DeLand, FL (US)

(73) Assignee: F4W, Inc., Lake Mary, FL (US)

( * ) Notice: Subject to any disclaimer, the term of this patent is extended or adjusted under 35 U.S.C. 154(b) by 471 days.

(21) Appl. No.: 11/383,899

(22) Filed: May 17, 2006

(65) Prior Publication Data

US 2007/0149120 A1 Jun. 28, 2007

Related U.S. Application Data

(60) Provisional application No. 60/754,120, filed on Dec. 27, 2005.

(51) Int. Cl.
*H04M 1/00* (2006.01)
(52) U.S. Cl. ............... 455/550.1; 455/552.1; 455/12.1; 370/316; 709/220
(58) Field of Classification Search ............... 455/550.1, 455/552.1, 12.1; 370/316; 709/220
See application file for complete search history.

(56) References Cited

U.S. PATENT DOCUMENTS

| 6,810,413 | B1 * | 10/2004 | Rajakarunanayake et al. .... 709/203 |
| 2002/0059637 | A1 * | 5/2002 | Rakib ......................... 725/119 |
| 2003/0188320 | A1 * | 10/2003 | Shing ......................... 725/131 |
| 2004/0010561 | A1 * | 1/2004 | Kim et al. .................... 709/208 |
| 2005/0105484 | A1 * | 5/2005 | Wilson ....................... 370/316 |
| 2005/0228897 | A1 * | 10/2005 | Yamamoto et al. .......... 709/231 |
| 2005/0249145 | A1 * | 11/2005 | Wilson ....................... 370/316 |
| 2006/0199567 | A1 * | 9/2006 | Alston ..................... 455/412.1 |
| 2006/0212549 | A1 * | 9/2006 | Hokkyo et al. .............. 709/220 |

* cited by examiner

*Primary Examiner*—Danh C Le
(74) *Attorney, Agent, or Firm*—The Eclipse Group LLP

(57) ABSTRACT

A system for establishing and maintaining communications across disparate networks comprises a satellite dish and control unit comprising a network management server and a satellite data conversion component. The control unit may further comprise an application server and a satellite dish alignment component. The system may further comprise at least one access point and a plurality of wireless routers. In certain embodiments, the system is relatively easy to deploy and can even be used when traditional network infrastructure is unavailable.

16 Claims, 9 Drawing Sheets

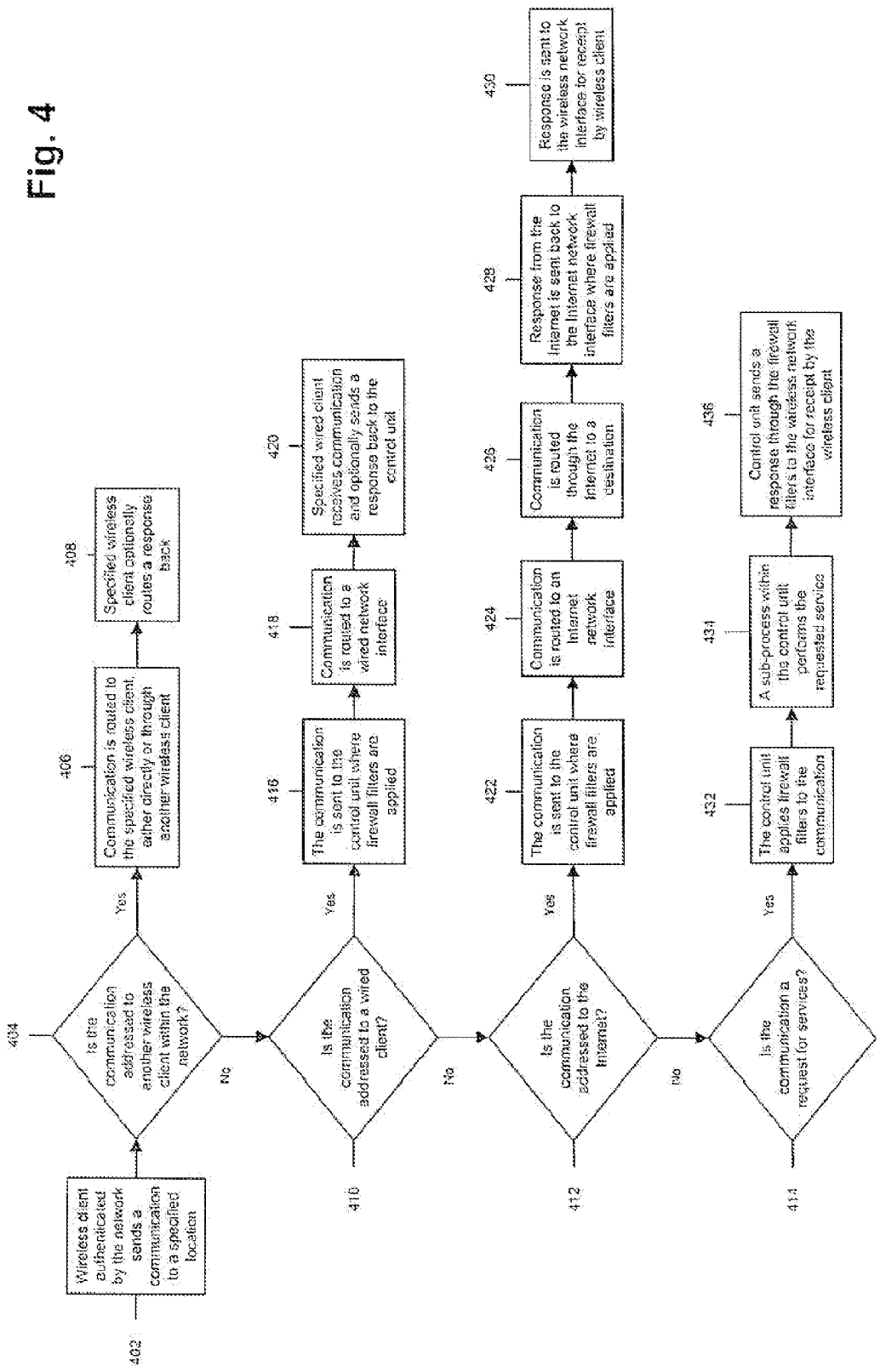

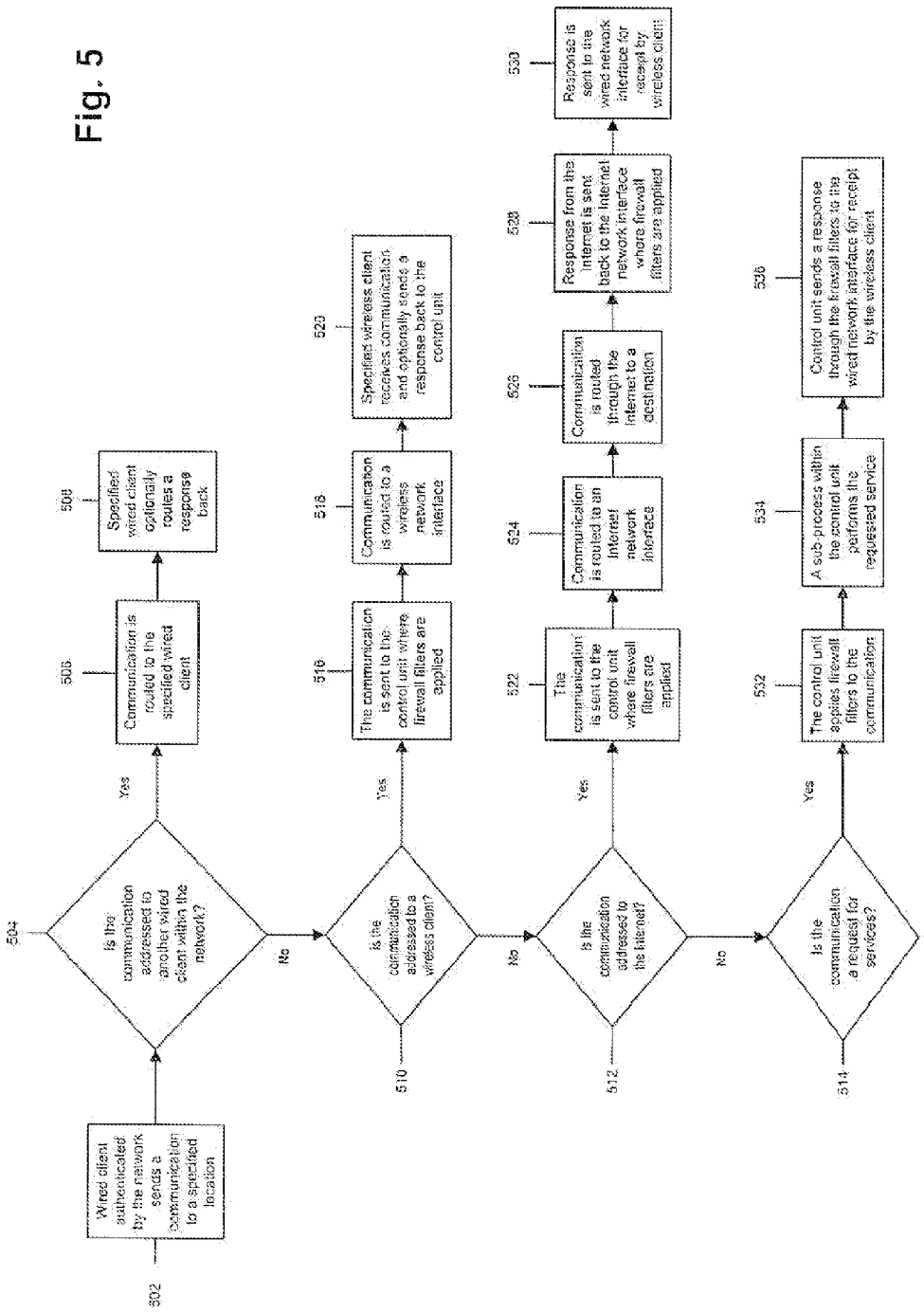

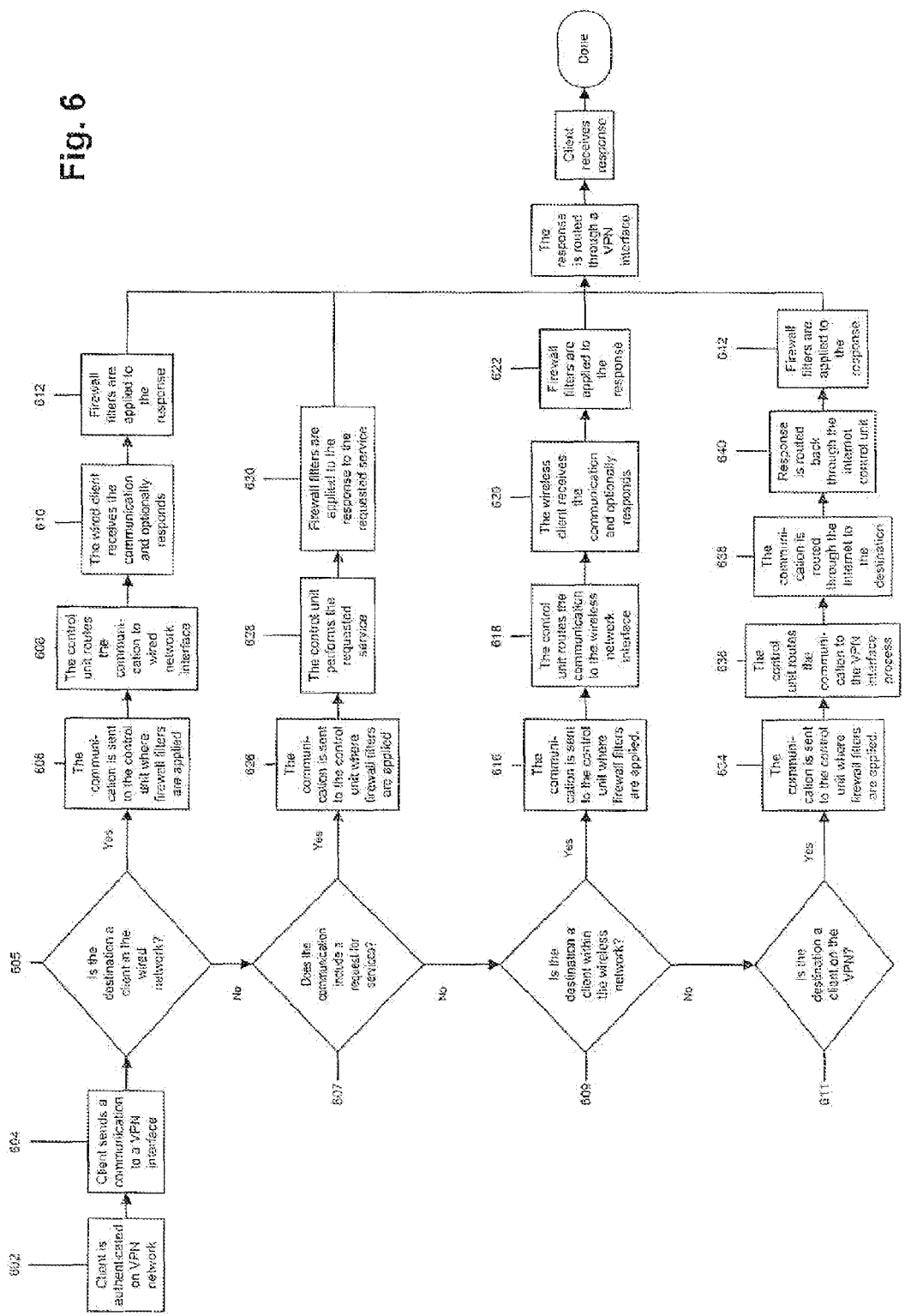

SYSTEM AND METHOD FOR ESTABLISHING AND MAINTAINING COMMUNICATIONS ACROSS DISPARATE NETWORKS

CROSS REFERENCE TO RELATED APPLICATIONS

This application claims priority from U.S. Provisional Application No. 60/754,120, filed Dec. 27, 2005.

FIELD OF THE INVENTION

The present invention relates to systems adapted for communication across disparate networks and more particularly to systems for establishing communication across such networks in the absence of fixed networking infrastructure.

BACKGROUND

Existing networking solutions work well when fixed infrastructure provides the necessary power and network connectivity to users in relatively fixed locations. But for mobile network users such as first responders, law enforcement officers and other emergency personnel, known networking solutions do not necessarily provide the same reliable broadband network connectivity. Particularly with environmental disasters, such as hurricanes, chemical spills, floods, and the like, when fixed network infrastructure may be damaged or inaccessible, the ability to reliably send and receive voice and video communications, text messages, and other data is important.

There is a need for a reliable, portable and quickly deployable solution for coordination and linking of various wireless and wired broadband networks "in the field" —particularly one that can securely and seamlessly transmit data to and from network users, even if they are in a "scorched earth" environment. Ideally, this solution need not depend on access to network infrastructure and would be independent of network topology, having the ability to transparently integrate with mobile, fixed, mesh, and structured network environments, using various network-configurable protocols. It would also be advantageous if this solution could be installed or set up by a user without networking expertise.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 4 is a flow chart illustrating the steps for sending communications from a wireless client using the system of FIG. 2A.

FIG. 5 is a flow chart illustrating the steps for sending communications from a wired client using the system of FIG. 2A.

FIG. 6 is a flow chart illustrating the steps for establishing and sending communications over a virtual private network using the system of FIG. 2A.

DETAILED DESCRIPTION

A system enables the exchange of data, voice and video securely across disparate networks, even when traditional network infrastructure is unavailable, damaged or inaccessible. In one embodiment, a control unit comprising a network management server, allows users to communicate across a plurality of sub-networks, including private networks, such as wired and wireless networks within a local area and public networks like the Internet. Users can also communicate over a virtual private network ("VPN"), via the Internet. In the event of a nature disaster, where cell towers, public switched telephone network and power lines are down, the system can be deployed to establish a local area network for wired and wireless users alike. The system can be configured and deployed for use rapidly, between about 10.0 minutes and about 40.0 minutes, 20.0 minutes to about 40.0 minutes and more particularly between about 10.0 minutes and 20.0 minutes for example.

Figure 1:
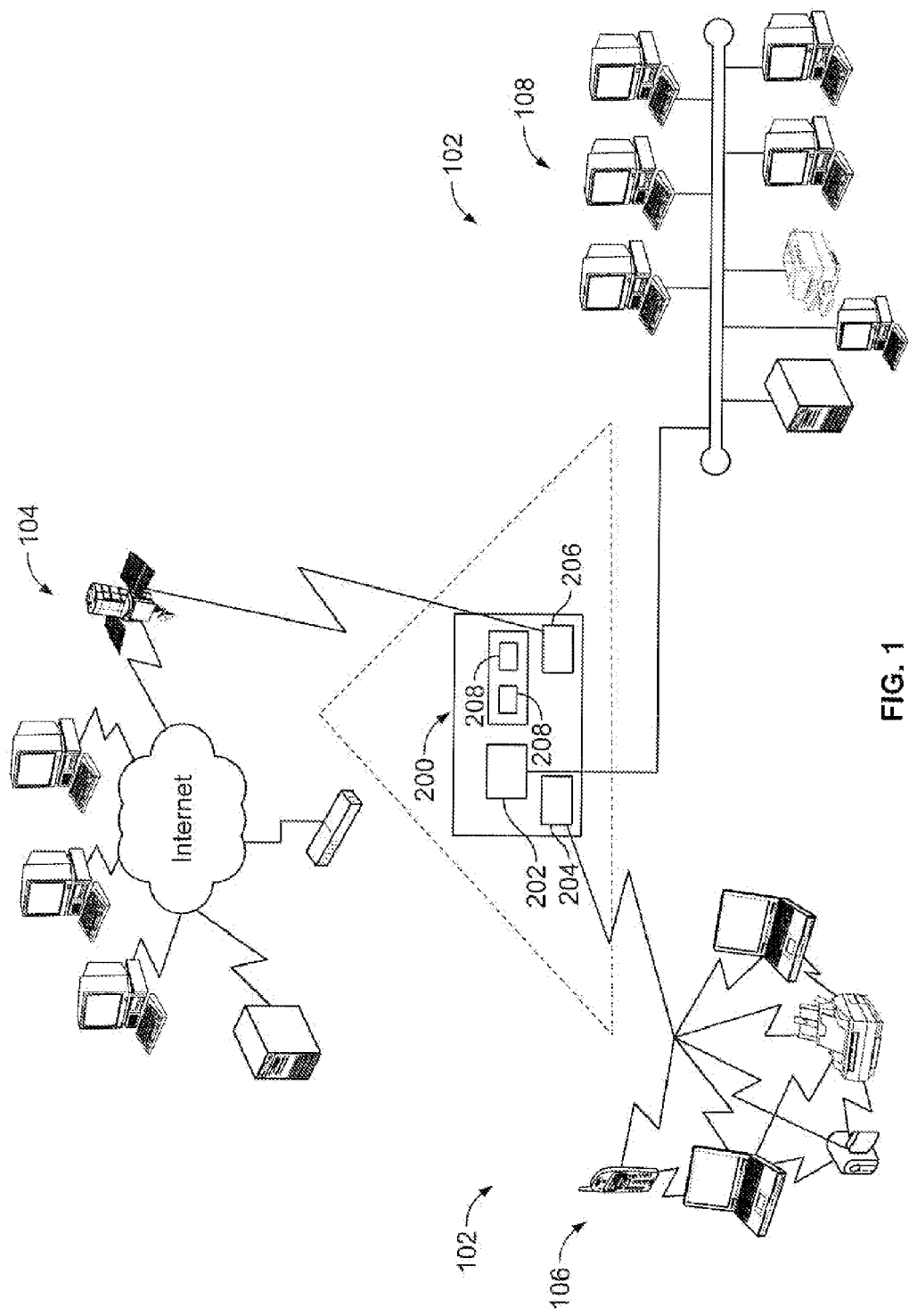
FIG. 1 is a network diagram illustrating disparate networks formed in accordance with one embodiment of the present invention.

As shown in FIG. 1, the system provides communication and services between various network communication devices across both private and public networks 102 and 104. The system establishes a local area private network 102 comprising wireless and/or wired sub-networks 106 and 108. Wireless sub-network 106 may comprise a mesh network and a logical wireless network for communication over Ethernet connections.

A mesh network is a network that routes data between nodes in the absence of a centralized server used for authentication, with self-authentication occurring between nodes in the network. Mesh networks provide continuous connections and reconfiguration around blocked paths by hopping from node to node in the most efficient path possible (by searching for the shortest path between two points) until connections can be established. Mesh networks are self healing, which means that the network can still operate even when a node or other connection is inoperable. Each node within the network authenticates the others. The nodes may, for example, be network communication devices, routers or network access points.

Each of wireless and wired sub-networks 106 and 108 may be designated with its own IP address space. For example, wireless sub-net 106 may be designated with 10.0/16 addresses and wired sub-net 108 may be designated with 192.168/16 addresses.

Wired and wireless users within the wireless and wired networks 106 and 108 can advantageously communicate with one another across virtually any network protocol, including without limitation Transmission Control Protocol/Internet Protocol (TCP/IP), User Datagram Protocol (UDP), Internet Packet Exchange (IPX), Sequenced Packet Exchange (SPX), etc. In addition, these users can quickly gain access to the Internet and use the Internet to communicate over a VPN.

Figure 2A:
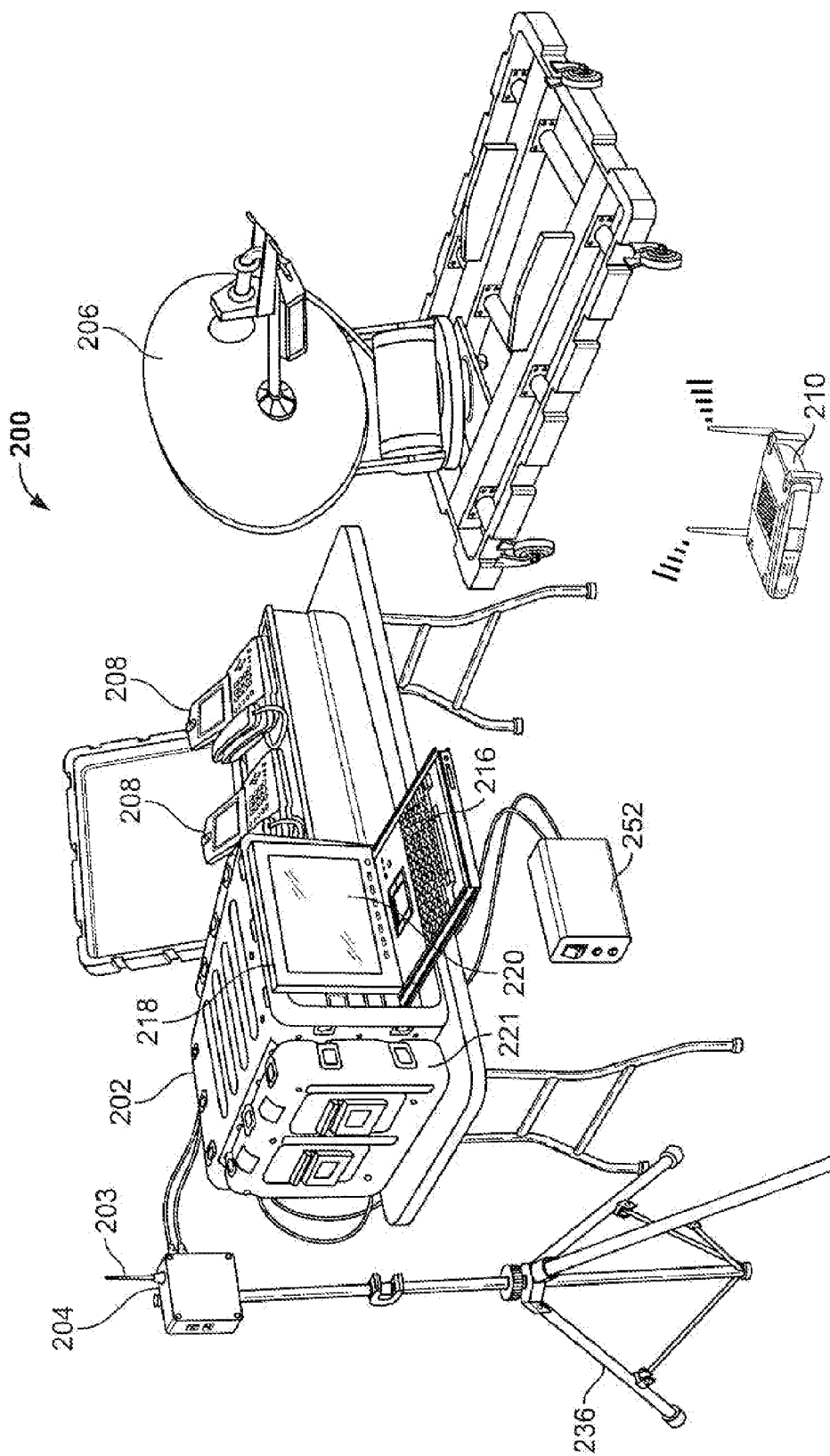
FIG. 2A is a system diagram illustrating a front perspective view of components utilized in forming the network of FIG. 1.
Figure 2B:
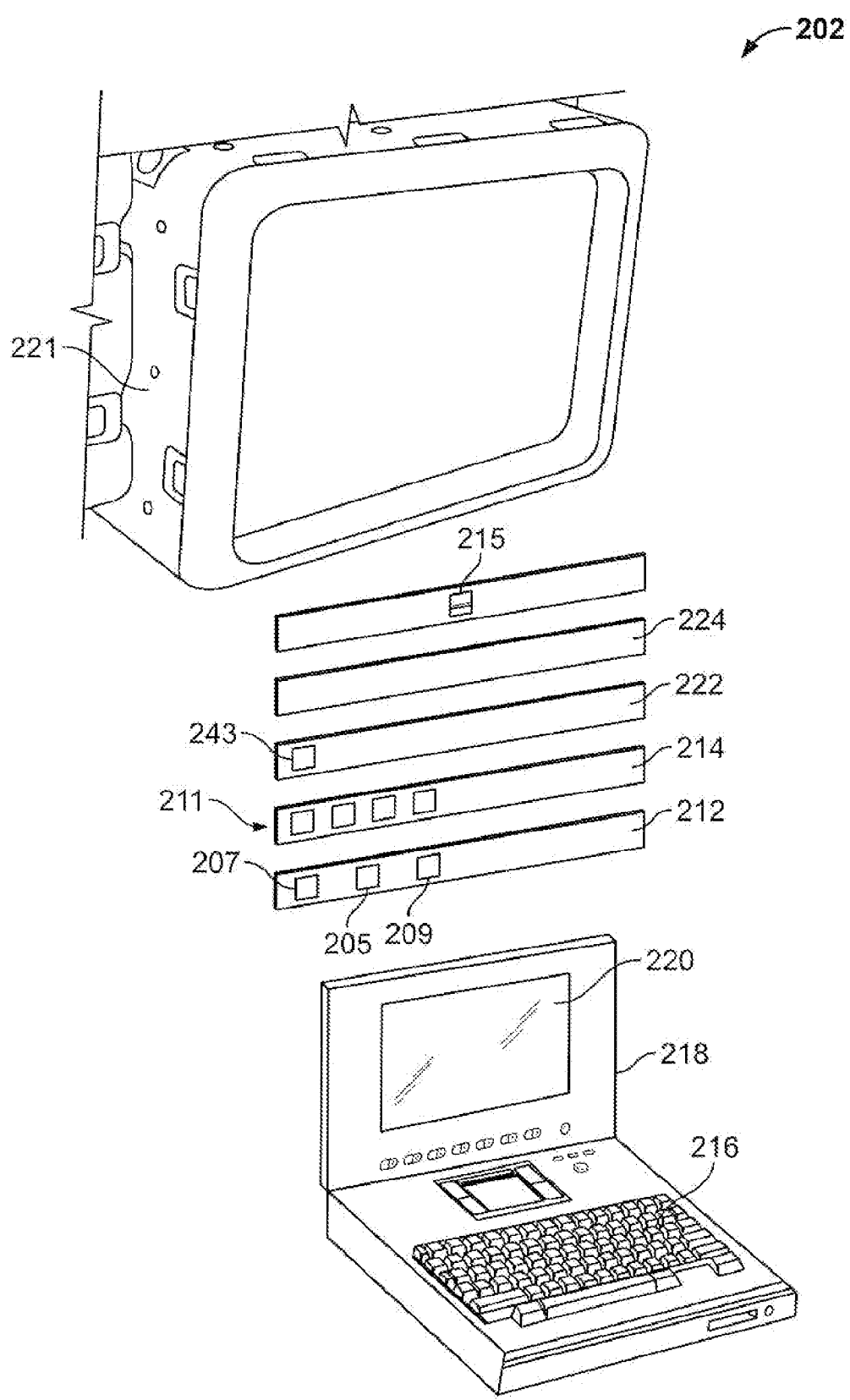
FIG. 2B is an exploded front perspective view of a control unit shown in FIG. 2A.
Figure 2C:
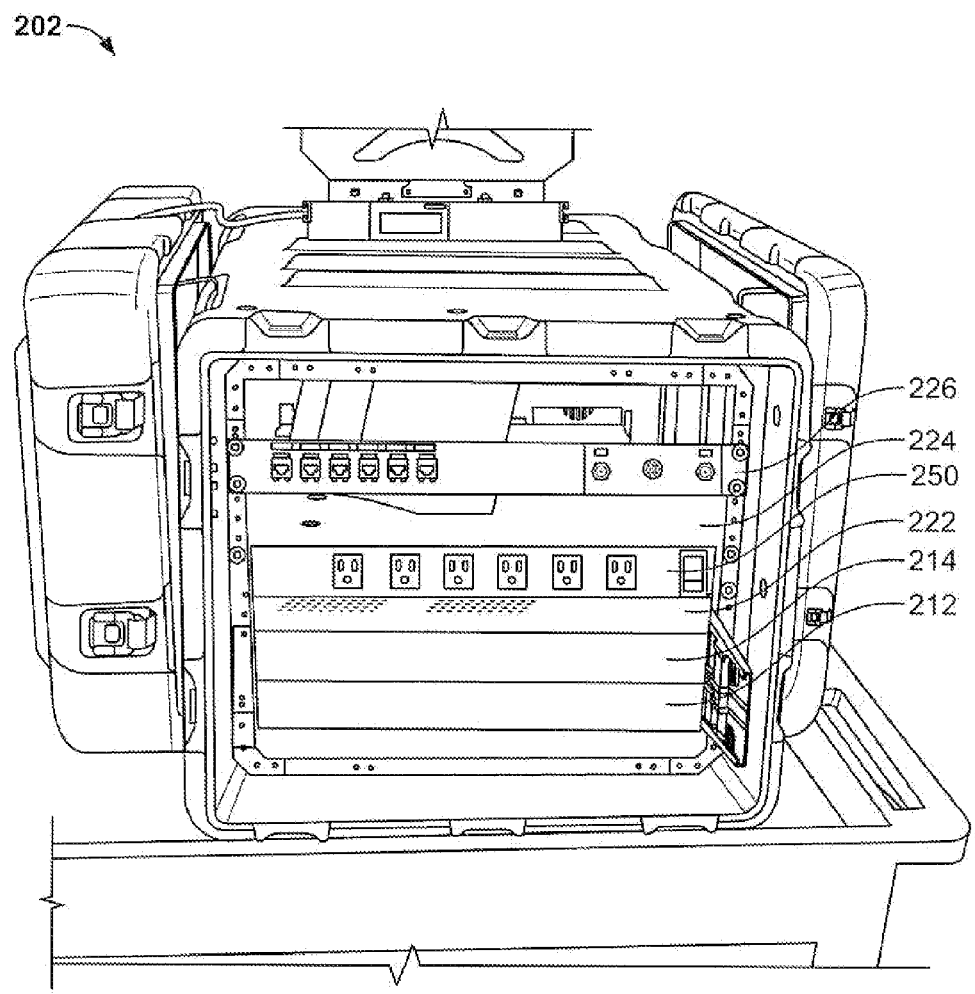
FIG. 2C is a rear view of the control unit of FIG. 2B.

FIG. 2A illustrates one embodiment of the system 200 of the present invention, which comprises control unit 202, access point 204, satellite dish 206 and network communication devices 208. The system may further comprise a plurality of wireless routers 210.

With reference to FIG. 2A-2D, control unit 202 may comprise network management server 212, application server 214, switch 215, input device 216, monitor 218 comprising display screen 220, satellite dish alignment component 222, satellite data conversion component 224, patch panel 226 comprising various connection ports hard wired into network management and application servers 212 and 214 and power strip 250. As described hereinafter, various connection cables, such as Ethernet cables, connect certain components within system 200 to one another.

The foregoing components of control unit 202 are typically mounted in a single rugged plastic case 221 and powered up through connection of power cable 250 to power source 252, such as a generator. The single rugged case may comprise dimensions between about 15.0 inches to about 25.0 inches in height, about 20.0 inches to about 30.0 inches in width and about 30.0 to about 40.0 inches in length. The case may comprise a pull-out rack for mounting the various components. One embodiment of case is available from Hardigg Industries, Inc. of South Deerfield, Mass. With the components mounted in the case, control unit typically weighs between about 100.0 pounds to about 200.0 pounds and more particularly between about 150.0 pounds to about 200.0 pounds. Thus, case 221, with control unit 202 positioned therein may be man-portable (capable of being physically carried by one to three men). Accordingly, control unit 202 may be packaged in a kit with instructions for assembling the system. The kit may comprise all or select components of control unit 202.

Network management server 212 is a device capable of managing and routing communications across disparate networks. Network management server 212 may comprise various network management and service sub-processes, described hereinbelow as well as certain network interface ports, including wired network interface 205 for communication with wired sub-network 108, wireless network interface 207 for communication with wireless sub-network 106 and Internet network interface 209 for communication with the Internet, via satellite dish 206. User may connect various wired devices to wired network interface, including computers, phones and the like. Network management server 212 may be a multi-purpose server running on a Linux operating system. The Linux operating system enables communication over different network protocols, including those network protocols listed above.

Application server 214 may operate on a windows based operating system and typically resides on wireless sub-network 106, with its own IP address. Application server 214 comprises four port switch 211, which connects in various ways to front and rear ports on patch panel 226 and to access point 204 for wireless sub-network 106 access. Application server 214 may further comprise various application sub-processes.

Switch (hidden from view) is used to control network management and application servers 212 and 214 with a single keyboard, monitor and mouse. Switch may be a keyboard video mouse switch ("KVM switch"). Alternatively, switch 215 may accomplish the same purpose through software that forwards the necessary input over standard network connections. Suitable examples include Synergy and Max-iVista available from Bartels Media.

Satellite dish alignment component 222 works in conjunction with satellite data conversion component 224 to align satellite dish 206 with a satellite (not shown) and convert the satellite signal into a usable protocol by system 200. The satellite provides a connection to the Internet. Satellite dish alignment component 222 typically comprises a Linux based computer with global positioning software and satellite dish port 243. One example is the alignment system available from TracStar Systems, Inc. of Orlando, Fla. Satellite data conversion component 224 can function like a TCP/IP standards compliant bridge, providing an interface between the satellite and the Internet. In essence, data conversion component 224 converts data received on an Ethernet port into a radio-frequency format for sending to the satellite. Satellite data conversion component 224 may be a Tachyon indoor unit (IDU), available from Tachyon Networks, Inc. of San Diego, Calif.

Access point 204, comprising antenna 203, is adapted to provide network communication devices 208 within its coverage area access to wireless and wired network services, serving as the principal network management interface to associated network communication devices 208 and wireless routers 210. In one embodiment, the term access point, as used herein, means a bridge between the wired and wireless networks. Access point 204 may also serves as a bridge between radio-frequency based communications and Ethernet based communications. In general, access point 204 comprises a first network interface card for radio-frequency transmissions—for example a mesh network memory card to communicate over a mesh network—and a second network interface card to communicate over Ethernet connections. In one embodiment, access point 204 is an IAP7300 Intelligent Access Point available from Motorola, Inc. of Schaumberg, Ill., which contains two or more 802.11 compliant radios and two or more mesh mobile broadband radios. In one embodiment, one set of radios operates in the unlicensed, 2.4 GHz band and the other set operates in the licensed, 4.9 GHz public safety band.

Instead of permanently affixing access point 204 on top of water towers, radio towers or light poles, it may be placed on tripod 236 for tactical deployment and ease of redeployment without dissolution of networks 102 and 104. Tripod 236 may be a four meter mast system rated to withstand up to 120 m.p.h. wind loads.

Satellite dish 206 may be auto-deployed to provide Internet access for temporary field locations, emergency response teams and special events. Dish 206 may be deployed within about two to three minutes. One embodiment of satellite dish 206 is available from Tachyon Networks, Inc. This embodiment automatically aligns with an airborne satellite through satellite dish alignment component 222. Satellite dish 206 may also be manually aligned with satellite, though this process takes additional time to properly deploy. Satellite dish may be mounted on a platform comprising wheels for ease of deployment and transport.

Network communication devices 208 may be laptop computers, personal computers (PC), wireless telephones, personal digital assistants (PDA), video cameras, or any other device capable of receiving and/or transmitting voice, video or data. In one embodiment, for example, wireless analog phones run in the 900 MHz or 5.8 GHz range, with base receiving stations and chargers located in a hardened case connected to a wireless element to communicate across the network. The case may comprise connectors for power and data cables, for connection to patch panel 226. In another embodiment, portable laptop computers comprise communication software application described in co-pending, co-owned U.S. patent application Ser. No. 11/383,775, entitled "Apparatus and Method for Dynamically Updating and Communicating Within Flexible Networks," of Dumas, et al., the entire disclosure of which is hereby incorporated by reference. These portable laptop computers can communicate over wireless sub-network 106 through mesh enabled network communication architecture.

The system may further comprise a plurality of wireless routers 210. Routers 210 may be strategically placed to increase network coverage in large geographic areas. Through the use of routing tables, routers 210 allow communications to travel in the most efficient manner from one point to another within wireless network 106. Use of routers 210 advantageously provides users with the capability of tapping into a fully enabled and scalable mesh network, with authentication at the router 210 level.

Figure 2D:
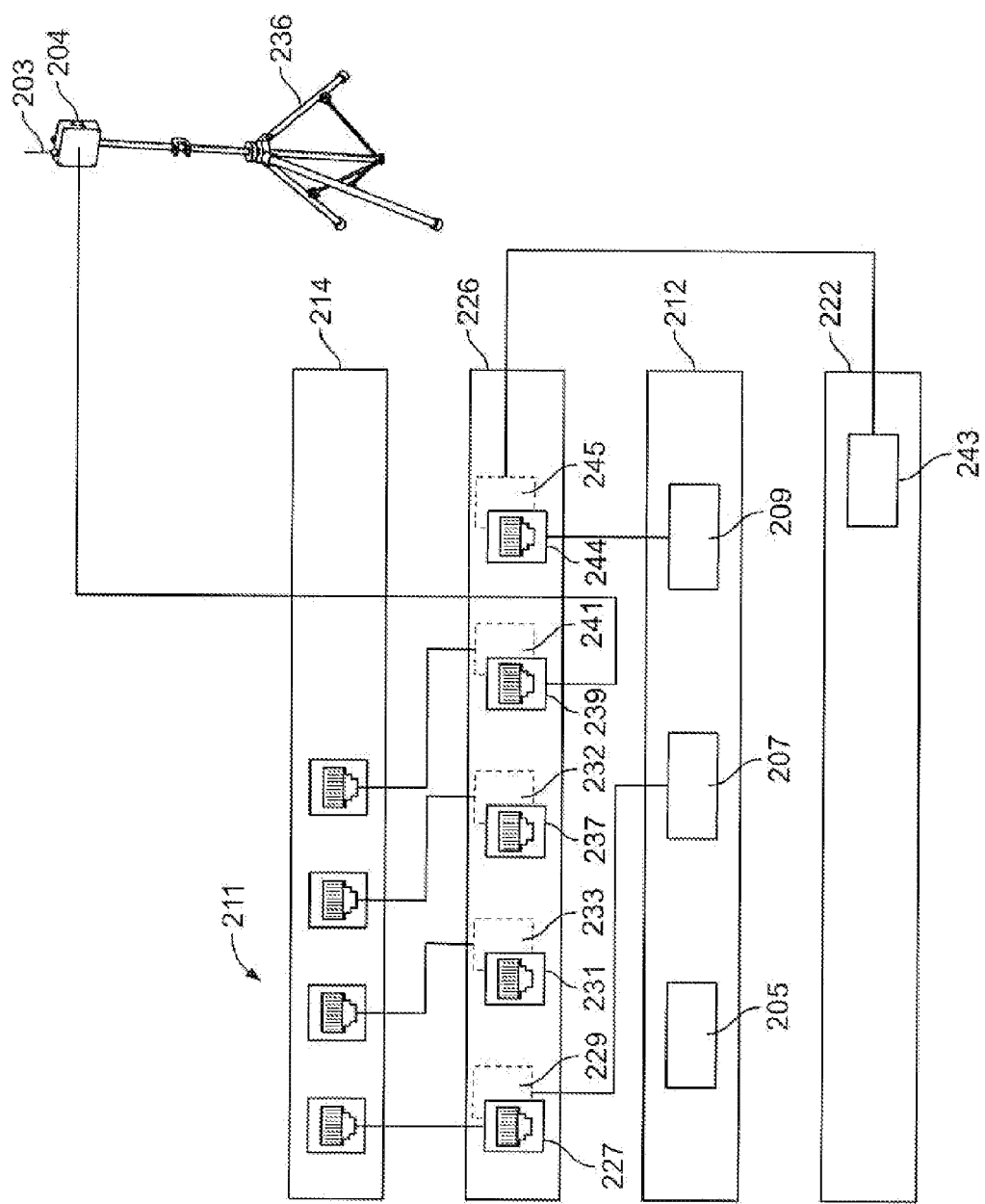
FIG. 2D illustrates the connections between various components in the system of FIG. 2A.

A plurality of Ethernet cables may be utilized to establish connections among the components and networks within system 200. Generally, speaking, the connections provide a path for data between applications, servers and the Internet. Although such connections may be configured in various ways, a preferred framework is illustrated in FIG. 2D and described hereinafter. Referring now to FIG. 2D, patch panel 226 comprises a plurality of front and rear ports, with each front port electrically connected to a corresponding rear port. Specifically, patch panel 226 comprises front and rear application server ports 227 and 229, first front and rear phone port 231 and 233, second front and rear phone ports 235 and 237, front and rear access point ports 239 and 241, and front and rear network management server ports 244 and 245.

Front application server port 227 connects to four port switch 211 while rear application server port 229 connects to wireless network interface 207 on network management server 212. In this way, application server 214 connects to wireless network 106 for sending and receipt of data over Ethernet connections.

First and second front phone ports 231 and 235 connect to base stations of network communication devices 208 used in the field. First and second rear phone ports 233 and 237 connect to four port switch 211. These connections enable communication over wireless network 106.

Front access point port 239 connects to access point 204, while rear access point port 241 connects to four port switch 211. The connection of access point 204 to control unit 202 in this way enables conversion of radio frequency based communications into Ethernet based communications for transmission of data over wireless network 106.

Front management server port 244 connects to Internet network interface port 209 on network management server 212 while rear management server port 245 connects to satellite dish port 243 on satellite dish alignment component 222. These connections are used for communications over the Internet.

Figure 3:
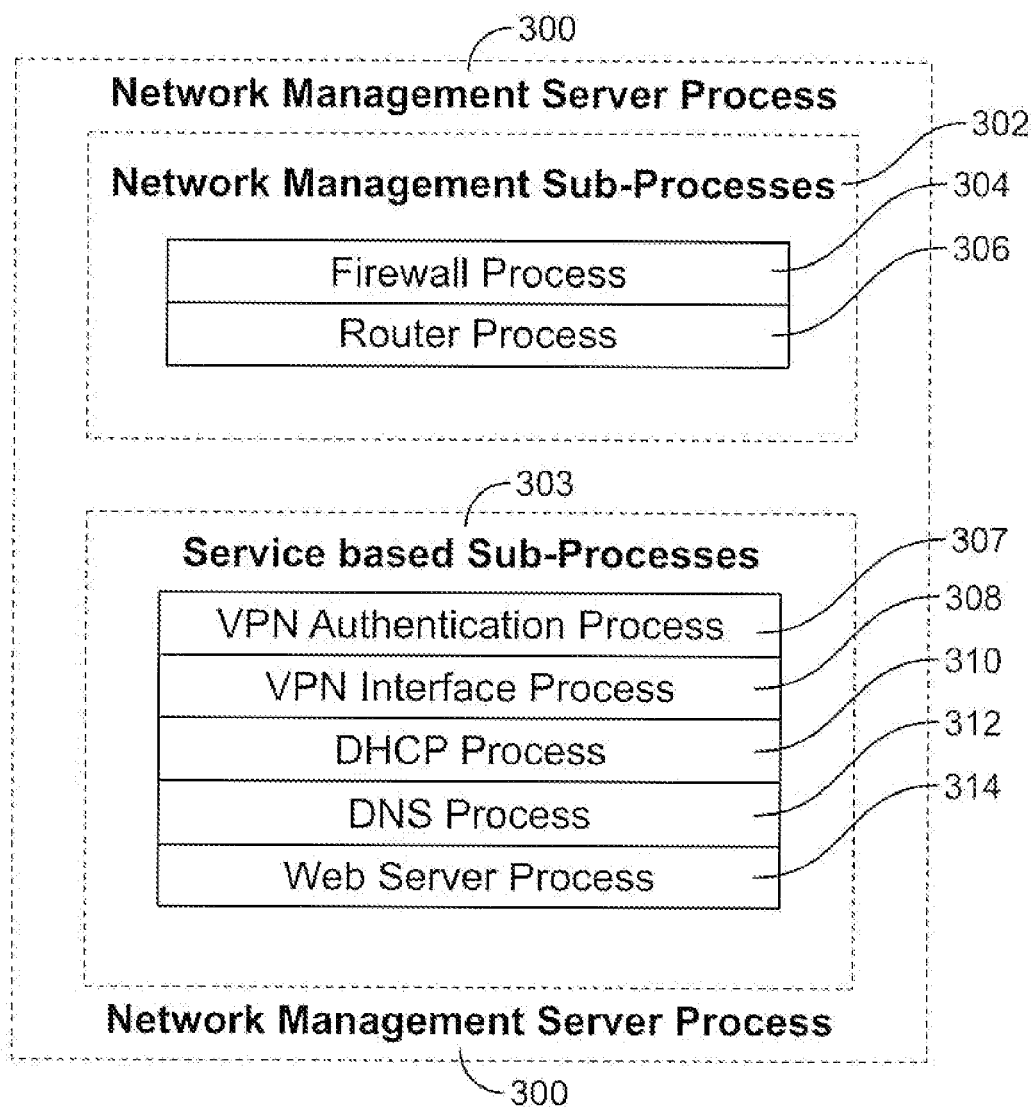
FIG. 3 illustrates the software components residing on the network management and application servers of FIGS. 2A-2D.

As shown in FIG. 3, network management server 212 comprises network management server process 300, which comprises various network management sub-processes 302, including firewall process 304 and routing process 306 as well as various service-based sub-processes 303 including, VPN authentication process 307, VPN interface process 308, dynamic host configuration protocol ("DHCP") process 310, domain naming system ("DNS") process 312 and web server process 314. Firewall process 304 filters unwanted incoming and outgoing communications from control unit 202, typically by validating that the source address corresponds to the particular network on which the communication was received and only allowing specific port numbers from the internet. Routing process 306 directs communications to the appropriate network interface. VPN authentication process 307 determines whether VPN clients are permitted network users. VPN interface process 308 provides a connection or interface to Internet for virtual private network connectivity. DHCP process 310 dynamically assigns IP addresses to devices on the network. DNS process 312 transforms a host name, such as an Internet Uniform Record Locator (URL), into an IP address by accessing the host via the satellite link. By caching the retrieved IP address locally, DNS process 312 decreases traffic over the satellite link when subsequent requests for the same host are made. Web server process 314 stores and provides information to network communication devices within the local area network (e.g., list of local telephone numbers). Network management server 212 may also comprise Mesh manager software for communicating over the mesh network.

Application server 214 may also comprise various application processes. Examples include video and audio sub-processes for video and audio communication and file transfer sub-process for transferring files within the networks.

Having described the components of system 200, we turn now to the stepwise sequence for assembly of system 200. As previously mentioned, system 200 is capable of being assembled with 10-40 minutes. Control unit 202 is positioned on a flat sturdy surface such that the operator has access to its front and rear. (At this point, the connections between the various ports on patch panel 226, network management and application servers 212 and 214 and access point 204 are already established). A power cable for control unit 202 is plugged into power strip 250 connected to a power generator 252, such as an AC power source. Satellite dish 206 is positioned on a level surface in alignment with the approximate location of a Geosynchronous satellite. Connection cables are secured to satellite dish 206 and appropriate locations on control unit 202. If phones are being used, other connection cables, such as Ethernet Cat-5 cables, can be used to connect the phones to first and second front phone ports 231 and 235 within patch panel 226. Tripod 236 is set up and access point 204 positioned on top thereof. Antenna 203 is connected to access point 204 and connection cables (Ethernet Cat-5) are secured to access point 204 and front access point port 239. Power cables connect access point 204 to power strip 250 or the AC power source. Control unit 202 is started by powering on network management and application servers 212 and 214 as well as satellite dish alignment component 222. Input device 216 and monitor 218 are pulled out of case and locked into position.

After assembly of system 200, communication across the disparate sub-nets may occur. Prior to communication, however, clients are typically authenticated. Clients operating in the wired and wireless network, for example, are authenticated through access point 204 or wireless router 210. Each individual client forwards its media access control ("MAC") addresses to access point 204 along with a request for DHCP services to network management server 212. If the MAC addresses are recognized, access point 204 informs network management server 212, which forwards an IP address back through access point 204 and on to the client. If the client is a VPN user, a request for authentication is sent to network management server 212, where VPN authentication process 307 determines whether the client is a permitted user. VPN authentication may occur in various ways, via static keys, username and password, etc.

Once clients have been authenticated, communication adheres to a general framework that may be adjusted depending on the source/destination and nature of the communication being sent. Generally, the destination client of the communication is determined as one of the first steps. If the destination client employs the same type of device as the source client, the communication is routed directly thereto without traveling through network management server 212. Otherwise, the communication is sent to network management server 206, where firewall process 304 filters it according to the firewall rules in place. Router process 306 then directs the communication to the appropriate network interface for receipt by the destination client. Depending on the nature of the communication, the destination may respond through control unit 202 in a similar manner.

FIG. 4 illustrates the steps for sending communications from a wireless client using system 200. In step 402, the wireless client sends a communication packet to a specified location. The ultimate destination and nature of the communication packet govern next steps.

In step 404, the system ascertains whether the communication packet is addressed to another wireless client in the network. If so, in step 406, the communication packet is routed directly to that client or through another wireless client in the network. The receiving client, in step 408, optionally sends a response back. If the communication packet is not addressed to a wireless client, the system checks to see if the communication packet is addressed to a wired client (step 410), the Internet (step 412) or includes a request for a service by control unit 202 (step 414).

If the communication packet is addressed to a wired client, it is sent to control unit 202, where, in step 416, firewall process 304 filters the communication packet. In particular, firewall process 304 verifies that the source and destination IP addresses correspond to the particular network on which the communication was received and processes a set of configurable rules based on IP address, port protocol, application, etc. In step 418, routing process 306 routes the communication packet to the wired network interface, typically an Ethernet port connected to the wired network. In step 420, the wired client receives the communication packet and optionally sends back a response, which begins the process anew.

If the communication packet is addressed to the Internet (e.g., a mail server or URL), in step 422, it is sent to control unit 202 where firewall process 304 checks the IP address of its source. Since the ultimate destination on the Internet is not always known, firewall process does not necessarily check the destination IP address. In step 424, routing process 306 routes the communication packet to Internet gateway network interface 209, typically an Ethernet port connected to the Internet. In step 426, the communication packet is routed through the Internet to its destination. More specifically, the packet is routed through satellite data conversion component 224 and up to the airborne satellite for connectivity to the Internet. In step 428, a response from the Internet is sent back to Internet network interface 209 via satellite data conversion component 224 so firewall process 304 can ensure that the destination of the response corresponds to the particular network on which the communication was received. In step 430, routing process 306 routes the response to the wireless network interface for receipt by the wireless client.

If the communication packet comprises a request for services by network management server 212, in step 432, firewall process 304 checks the source IP address. In step 434, one of the service-based sub-processes 303 performs the requested service. In step 436, a response is sent through the firewall filters, to verify the IP address of the destination within the network, and on to wireless network interface 207 for receipt by the destination that initially sent the request.

FIG. 5 illustrates the steps for sending communications from a wired client using system 200. In step 502, the wired client sends a communication packet to a specified location. Once again, the ultimate destination and nature of the communication packet govern next steps.

In step 504, the system ascertains whether the communication packet is addressed to another wired client in the network. If so, in step 506, the communication packet is routed to that client within the network. The receiving wired client, in step 508, optionally routes a response back. If the communication packet is not addressed to a wired client, the system checks to see if the communication packet is addressed to a wireless client (step 510), the Internet (step 512) or includes a request for a service by control unit 202 (step 514).

If the communication packet is addressed to a wireless client, it is sent to control unit, where, in step 516, firewall process 304 filters the communication packet. Here again, firewall process 304 verifies that the source and destination IP addresses correspond to the particular network on which the communication was received. In step 518, routing process 306 routes the communication packet to wireless network interface 207, typically an Ethernet port corresponding and connected to wireless network 106. In step 520, the wireless client receives the communication packet and optionally sends back a response, which begins the process anew.

If the communication packet is addressed to the Internet (e.g., a mail server or URL), in step 522, it is sent to control unit 202 where firewall process 304 checks the source IP address. Prior to sending, the originator of the packet will probably have retrieved the destination address through a DNS lookup, which will be fulfilled by control unit 202 via DNS process 312. The DNS request will be fulfilled from a local cache if possible, limiting traffic to local network. In step 524, routing process 306 routes the communication packet to Internet gateway network interface 209, typically an Ethernet port corresponding and connected to the Internet. In step 526, the communication packet is routed through the Internet to its destination. More specifically, after receipt by network interface 209, the packet is routed up to the satellite for connectivity to the Internet. In step 528, a response from the Internet is sent back to Internet network interface 209 and firewall process 304 ensures that the destination of the response is authenticated. In step 530, the response is sent to wired network interface 205, for receipt by the wired client.

If the communication packet comprises a request for services by network management server 212, in step 532, firewall process 304 verifies that the source IP address corresponds to the particular network on which the communication was received. In step 534, one of the service-based sub-processes 303 performs the requested service. In step 536, a response is sent through the firewall process 304, and on to wired network interface 205 for receipt by the client that initially sent the request.

FIG. 6 illustrates the steps for sending communications over a virtual private network. In step 602, a client, such as a client within wireless or wired sub-nets 106 and 108 or a client outside the local area network, is authenticated by VPN authentication process 307 on network management server 210. In step 604, the client sends a communication to VPN interface process 308, also residing on network management server 210. The system checks to see if the communication packet is addressed to a wired client (step 605), a wireless client (step 609) or another VPN client (step 611) or includes a request for a service by control unit 202 (step 607).

If wired network 108 is the destination, in step 606, firewall process 304 filters the communication by ensuring that the IP addresses of the source and the destination correspond to the particular network on which the communication was received. In step 608, routing process 306 forwards the communication to the wired network interface. In step 610, the wired client receives the communication and can respond. In step 612, firewall process 306 filters the response by checking the IP addresses of the source and destination. The response is forwarded through VPN interface process 308 for receipt by the client.

If wireless network 106 is the destination, in step 616, firewall process 304 filters the communication. In step 618, routing process 306 forwards the communication to wireless network interface 207. In step 620, the wireless client receives the communication and may respond to the VPN client. In step 622, firewall process 304 filters the response. The response is forwarded through the VPN interface process 308 for receipt by the VPN client.

If the communication comprises a request for services by network management server 212, in step 626, firewall process 304 ensures that the source IP address corresponds to the particular network on which the communication was received. In step 628, one of service-based sub-processes 303 performs the requested service. In step 630, a response is filtered through firewall process 304, to verify the IP address of the destination corresponds to the particular network on which the communication was received. The response is forwarded through VPN interface process 308 for receipt by the VPN client.

If the destination is another VPN client, in step 634, firewall process 304 filters the communication by confirming that the source and destination IP addresses corresponds to the particular network on which the communication was received. In step 636, routing process 306 routes the communication to VPN interface process 308, which, in turn, routes the communication through the Internet to its destination in step 638. In step 640, a response is sent back through the Internet and ultimately filtered by firewall process 304 in step 642. The response is forwarded through VPN interface process 308 for receipt by the VPN client.

Variations, modifications and other implementations of what is described herein will occur to those of ordinary skill in the art without departing from the spirit and scope of the invention. For example, four port switch 211 may reside on other components within system, including network management server 212. Accordingly, the invention is in no way limited by the preceding illustrative description.

We claim:

1. A system for establishing and maintaining communications over two or more disparate networks comprising:
   a satellite dish alignable with an airborne satellite, the satellite dish adapted to communicate with the airborne satellite for connectivity to the Internet;
   a control unit comprising an input device, a display screen, a satellite data conversion component adapted to convert data into a format recognizable by the satellite and a network management server comprising a wireless network interface and an Internet network interface, the network management server adapted to route communications across the disparate networks through the wireless network interface and the Internet network interface; and
   wherein the system enables communication over the Internet and across a wireless local area network.

2. The system of claim 1, wherein the system is capable of being deployed for use within about twenty to about forty minutes.

3. The system of claim 1, wherein the system is operable in the absence of a fixed network infrastructure, including at least one of cell towers, power lines and publicly switched telephone lines.

4. The system of claim 1, wherein the control unit is positioned within a single man-portable case.

5. The system of claim 1, wherein the network management server comprises a firewall process for filtering incoming and outgoing communications.

6. The system of claim 1, wherein the control unit comprises a satellite alignment component for automatically aligning the satellite dish with the airborne satellite.

7. The system of claim 1, wherein the wireless network comprises a wireless mesh network.

8. The system of claim 1, further comprising at least one wireless router.

9. The system of claim 1, further comprising an application server comprising a plurality of application sub-processes including video and audio sub-processes for video and audio communication and a file transfer sub-process for transferring files over the disparate networks.

10. The system of claim 1, wherein the system enables communication over a virtual private network.

11. A system for establishing and maintaining communications over disparate networks comprising:
    a satellite dish alignable with an airborne satellite, the satellite dish for communicating with the airborne satellite for connectivity to the Internet;
    a control unit comprising an input device, a display screen, a network management server comprising a wireless network interface, a wired network interface and an Internet network interface, the network management server adapted to route communications across the disparate networks through the wireless network interface, the wired network interface and the Internet network interface, the control unit further comprising a satellite data conversion component adapted to convert data received from at least one of the wireless and wired network into a format recognizable by the satellite; and
    an access point adapted to enable communication between the wired and wireless networks.

12. The system of claim 11, further comprising a plurality of connections between the network management server, the satellite data conversion component and the access point for providing a path for data between applications, servers and the Internet.

13. The system of claim 11, further comprising a plurality of network communication devices adapted to communicate across the disparate networks.

14. The system of claim 11, wherein the network management server comprises a firewall process for filtering incoming and outgoing communications.

15. The system of claim 11, wherein the control unit comprises a satellite alignment component for automatically aligning the satellite dish with the airborne satellite.

16. The system of claim 11, wherein the system is capable of being deployed for use within about twenty to about forty minutes.

\* \* \* \* \*

US 7,546,139 C1

(12) EX PARTE REEXAMINATION CERTIFICATE (10385th)
United States Patent
Money et al.

(10) Number: US 7,546,139 C1
(45) Certificate Issued: Nov. 5, 2014

(54) SYSTEM AND METHOD FOR ESTABLISHING AND MAINTAINING COMMUNICATIONS ACROSS DISPARATE NETWORKS

(75) Inventors: James Keith Money, Heathrow, FL (US); Phillip James DuMas, DeLand, FL (US)

(73) Assignee: Isotropic Networks, Inc., Lake Geneva, WI (US)

Reexamination Request:
No. 90/012,981, Sep. 9, 2013

Reexamination Certificate for:
Patent No.: 7,546,139
Issued: Jun. 9, 2009
Appl. No.: 11/383,899
Filed: May 17, 2006

Related U.S. Application Data

(60) Provisional application No. 60/754,120, filed on Dec. 27, 2005.

(51) Int. Cl.
*H04M 1/00* (2006.01)

(52) U.S. Cl.
USPC .... 455/550.1; 370/316; 455/12.1; 455/552.1; 709/220

(58) Field of Classification Search
None
See application file for complete search history.

(56) References Cited

To view the complete listing of prior art documents cited during the proceeding for Reexamination Control Number 90/012,981, please refer to the USPTO's public Patent Application Information Retrieval (PAIR) system under the Display References tab.

*Primary Examiner* — Jeffrey Carlson

(57) ABSTRACT

A system for establishing and maintaining communications across disparate networks comprises a satellite dish and control unit comprising a network management server and a satellite data conversion component. The control unit may further comprise an application server and a satellite dish alignment component. The system may further comprise at least one access point and a plurality of wireless routers. In certain embodiments, the system is relatively easy to deploy and can even be used when traditional network infrastructure is unavailable.

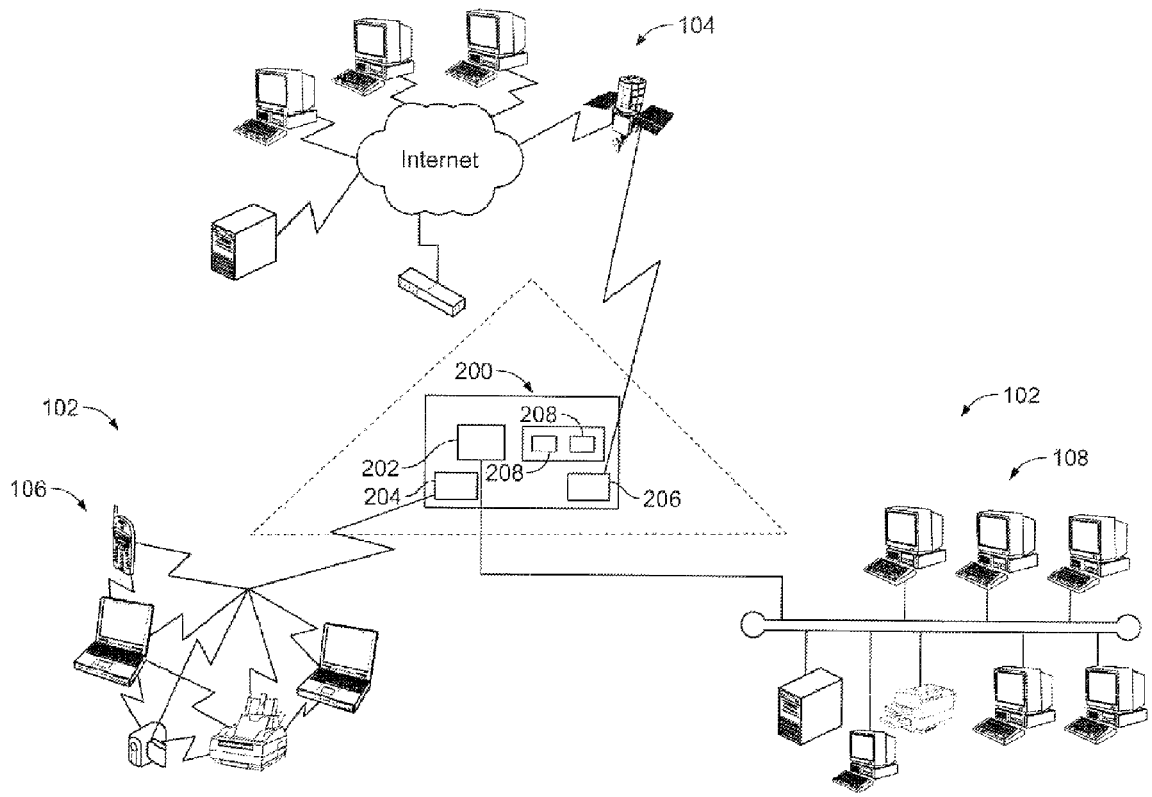

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

\* \* \* \* \*